United States Patent Office
3,275,684
Patented Sept. 27, 1966

3,275,684
BIS[9-(SUBSTITUTED ALKYL)-FLUOREN-9-YL] ALKANES
Henry E. Fritz, South Charleston, and David W. Peck, Charleston, W. Va., assignors to Union Carbide Corporation, a corporation of New York
No Drawing. Original application Sept. 10, 1962, Ser. No. 222,694, now Patent No. 3,205,257, dated Sept. 7, 1965. Divided and this application Mar. 8, 1965, Ser. No. 438,033
6 Claims. (Cl. 260—515)

This application is a divisional of application Serial No. 222,694, filed September 10, 1962, now U.S. Patent No. 3,205,257, issued September 7, 1965.

This invention relates to novel fluorene derivatives. More particularly, this invention relates to bis[9-(substituted alkyl)fluoren-9-yl]alkanes of the formula:

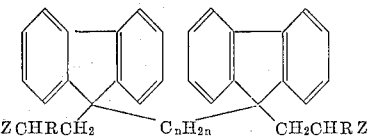

ZCHRCH$_2$     C$_n$H$_{2n}$     CH$_2$CHRZ wherein $n$ is an integer having a value of from 2 to 10 and preferably from 2 to 6; Z is a cyano radical, a —COOR$^1$ radical, or a —CH$_2$NHR$^2$ radical; R is a hydrogen atom or a methyl radical, i.e., a radical of the formula —C$_x$H$_{2x+1}$ wherein $x$ is an integer having a value of from 0 to 1; R$^1$ is a hydrogen atom, an alkali metal atom, or an alkyl radical having from 1 to about 10 carbon atoms; and R$^2$ is a hydrogen atom or an alkanoyl radical having from 1 to about 5 carbon atoms in the alkyl radical thereof. Thus, the compounds of this invention are novel bis[9-(2-cyanoalkyl)fluoren-9-yl]alkanes; bis[9-(2-carboxyalkyl)fluoren-9-yl]alkanes and their alkali metal salts or alkyl esters; bis[9-(N-alkanoyl-3-aminoalkyl)fluoren-9-yl]alkanes; and bis[9-(3-aminoalkyl)fluoren-9-yl]alkanes.

The novel carboxyl and amino compounds of this invention are useful in themselves as monomers for the formation of new polymers, such as polyesters, polyamides, and the like; while the cyano compounds are useful as intermediates for the production of polymerizable monomers. For example, the cyano derivatives of this invention can be hydrolyzed to form dicarboxylic acids which are useful in the production of polyesters or polyamides. The cyano derivatives can also be hydrogenated in the presence of an alkali metal alkanoate to produce N-alkanoylamino derivatives which can be hydrolyzed to form an amine derivative useful in the production of polyamides, polyureas, and the like.

The novel bis[9-(substituted alkyl)fluoren-9-yl]alkanes of this invention are all readily produced from the bis(9-fluorenyl)alkanes of the formula:

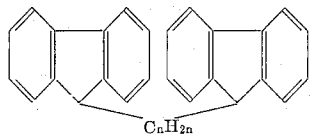

C$_n$H$_{2n}$ wherein $n$ is as previously defined. The bis(9-fluorenyl) alkanes are produced by reacting a fluorene with a diol in the presence of an alkali metal hydroxide as a catalyst.

By the term "fluorene" is meant both fluorene and fluorene compounds which are substituted on the aromatic rings with alkyl, aryl, alkaryl, aralkyl, alkoxy, aryloxy, alkaryloxy, and aralkoxy radicals having up to 10 carbon atoms. As examples of suitable fluorene compounds, one can mention fluorene, 1-methylfluorene, 2-methylfluorene, 3-methylfluorene, 4-methylfluorene, 5-methylfluorene, 6-methylfluorene, 7-methylfluorene, 8-methylfluorene, 2-hexylfluorene, 2-phenylfluorene, 2-(1-naphthyl)fluorene, 2-(2-methylphenyl)fluorene, 2-benzylfluorene, 2-methoxyfluorene, 2-phenoxyfluorene, 2-(2-methylphenoxy)fluorene, 2-benzyloxyfluorene, and the like.

The diols employed to produce the bis(9-fluorenyl)alkanes are represented by the formula HOC$_n$H$_{2n}$OH wherein $n$ is as defined above. As examples of suitable diols one can mention ethylene glycol, propylene glycol, tetramethylene diol, decamethylene diol, pentamethylene diol, hexamethylene diol, and the like. In producing the bis(9-fluorenyl)alkanes the concentration of diol in the charge can vary from about 0.1 mole or less to about 10 moles or more, per mole of fluorene compound charged, with from about 0.5 to about 2.0 moles of diol per mole of fluorene compound being preferred.

As stated above, an alkali metal hydroxide, such as lithium hydroxide, sodium hydroxide, potassium hydroxide, and the like, is employed as a catalyst in producing the bis(9-fluorenyl)alkanes, with potassium hydroxide being preferred. The amount of alkali metal hydroxide used can vary from about 0.1 mole or less to about 1.0 mole or more per mole of fluorene compound charged, with from about 0.2 to about 0.5 mole of alkali metal hydroxide per mole of fluorene compound being preferred. The reaction of diol with fluorene is conducted at a temperature of from about 175° C. or lower to about 275° C. or higher, with temperatures of from about 220° C. to about 250° C. being preferred.

The bis(9-fluorenyl)alkane is readily recovered from the reaction mixture by slurrying the reaction mixture with water to dissolve unreacted diol and the alkali metal hydroxide and then filtering the insoluble bis(9-fluorenyl)-alkane from the aqueous slurry. If desired, the bis(9-fluorenyl)-alkane can be further purified by washing with water or methanol, or by recrystallization from an organic solvent, for example, 1,4-dioxane.

Reaction of the bis(9-fluorenyl)alkane with a cyanoalkene such as acrylonitrile or methacrylonitrile produces the bis[9-(2-cyanoalkyl)fluoren-9-yl]alkanes having the formula:

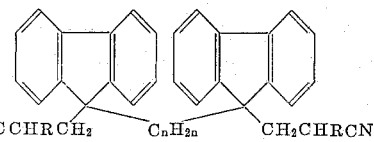

NCCHRCH$_2$     C$_n$H$_{2n}$     CH$_2$CHRCN wherein $n$ and R are as previously defined. As examples of these compounds one can mention 1,2-bis[9-(2-cyanoethyl)fluoren-9-yl]ethane, 1,4-bis[9-(2-cyanoethyl)fluoren-9-yl]butane, 1,10-bis[9-(2-cyanoethyl)fluoren-9-yl]decane, 1,2-bis[9-(2-cyanopropyl)fluoren-9-yl]ethane, 1,10-bis[9-(2-cyanopropyl)fluoren-9-yl]decane, and the like.

As indicated, the bis[9-(2-cyanoalkyl)fluoren-9-yl]alkanes are produced by the cyanoalkylation of a bis(9-fluorenyl)alkane with a cyanoalkene such as acrylonitrile or methacrylonitrile. The cyanoalkylation can be carried out at from about 10° C. to about 50° C., preferably from about 20° C. to about 35° C., in the presence of a solvent for the bis(9-fluorenyl)alkane, for example, benzene, dioxane, pyridine, acetonitrile, tert.-butyl alcohol, etc. The mole ratio of cyanoalkene to bis(9-fluorenyl)alkane can vary from about 0.5:1 or less to about 5:1 or more, with ratios of from about 2:1 to about 3:1 preferred. The cyanoalkylation is assisted by a basic catalyst, such as the oxides, hydroxides, alkoxides, hydrides, cyanides, or amides of sodium or potassium. Quaternary ammonium hydroxides such as benzyltrimethylammonium hydroxide are particularly preferred as catalysts. In general, the basic catalysts are employed in the cyanoalkylation reaction in an amount varying from about 0.5 to about 10 weight percent, based upon the cyanoalkene, with from about 1 to about 5 weight percent preferred. Although the reactants can be charged in any order, it is preferred to gradually add the cyanoalkene to a stirred mixture of catalyst, bis(9-fluorenyl)alkane and solvent.

The bis[9-(2-cyanoalkyl)fluoren-9-yl]alkanes are solids which can be recovered from the reaction mixture by filtration. Additional bis[9 - (2 - cyanoalkyl)fluoren - 9-yl]alkane can be recovered from the filtrate by admixing the filtrate with water, whereupon the bis[9-(2-cyanoalkyl)fluoren-9-yl]alkane dissolved in the filtrate precipitates out and can be recovered by filtration. The bis[9-(2-cyanoalkyl)fluoren-9-yl]alkane can then be purified by conventional procedures.

The bis[9 - (2 - carboxyalkyl)fluoren - 9 - yl]alkanes and the alkali metal salts and alkyl esters thereof of this invention have the formula:

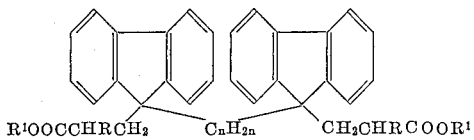

wherein $n$, R and $R^1$ are as defined above.

As examples of the novel dicarboxylic acids one can mention 1,2 - bis[9 - (2 - carboxyethyl)fluoren - 9-yl]ethane, 1,4 - bis - [9 - (2 - carboxyethyl)fluoren - 9-yl]butane, 1,10 - bis[9 - (2 - carboxyethyl)fluoren - 9-yl]decane, 1,2 - bis[9 - (2 - carboxypropyl)fluoren - 9-yl]ethane, 1,10 - bis[9 - (2 - carboxypropyl)fluoren - 9-yl]decane, and the like. These dicarboxyic acid compounds are readily produced by the hydrolysis of the corresponding bis[9 - (2 - cyanoalkyl)fluoren - 9 - yl]alkane compound or by the reaction of an alkali metal acrylate or alkali metal methacrylate with a bis-(9-fluorenyl)alkane followed by acidification of the resulting dialkali metal salt.

The hydrolysis of the bis[9-(2-cyanoalkyl)fluoren-9-yl]alkane to form the bis[9-(2-carboxyalkyl)fluoren-9-yl]-alkane can be conducted by methods known to those skilled in the art for the hydrolysis of the nitrile group. It is preferred, however, to reflux the bis[9-(2-cyanoalkyl)fluoren-9-yl]alkane in admixture with water, acetic acid, and hydrobromic acid, there being at least four moles of water and at least two moles of hydrobromic acid per mole of bis [9 (2 cyanoalkyl)fluoren-9-yl]alkane in the charge.

As indicated above, the bis[9-(2-carboxyalkyl)fluoren-9-yl]alkane also can be produced by reacting an alkali metal acrylate or alkali metal methacrylate with a bis(9-fluorenyl)-alkane in the presence of an alkali metal hydroxide as a catalyst. The mole ratio of alkali metal acrylate or alkali metal methacrylate to bis(9-fluorenyl)alkane in the charge can vary from about 1:1 to about 5:1, with a mole ratio of from about 2:1 to about 3:1 preferred. The alkali metal hydroxide is employed in an amount varying from about 0.1 to about 5 weight percent, based upon alkali metal acrylate or alkali metal methacrylate, with from about 0.5 to about 3 weight percent preferred. The reaction is conducted at a temperature of from about 150° C. to about 350° C., with a temperature of from about 190° C. to about 290° C. preferred. The immediate products of this process are the dialkali metal salts of the bis[9-(2-carboxyalkyl)fluoren-9-yl]alkanes such as the lithium, sodium, potassium, rubidium or cesium salts. These dialkali metal salts are readily acidified by methods known to those skilled in the art to produce the corresponding bis[9-(2-carboxyalkyl)fluoren-9-yl]alkane.

The bis[9 - (2 - carboxyalkyl)fluoren - 9-yl]alkanes are water-insoluble solids. Thus, they can be isolated from the reaction mixture from either of the foregoing processes by the addition of water and filtration of the aqueous mixture.

The bis[9-(2-carboxyalkyl)fluoren-9-yl]alkanes are readily converted to their alkyl esters, of the formula:

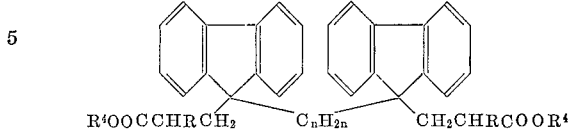

wherein $n$ and R are as previously defined and $R^4$ is an alkyl radical containing from 1 to 10 carbon atoms, such as methyl, ethyl, propyl, isopropyl, butyl, hexyl, 2-ethylhexyl, decyl and the like. The esters can be produced by procedures known to those skilled in the art, such as refluxing the selected acid and alcohol in the presence of an acid catalyst, for example, p-toluene sulfonic acid, to produce the ester, which is recovered by conventional procedures.

The bis[9-(N-alkanoyl-3-aminoalkyl)fluoren-9-yl]-alkanes of this invention have the formula:

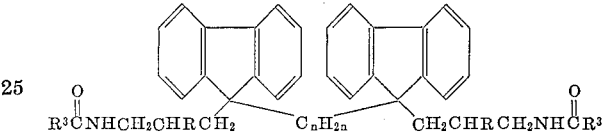

wherein $n$ and R are as previously defined and $R^3$ is an alkyl radical of from 1 to 5 carbon atoms. As examples of these compounds one can mention 1,2-bis[9-(N-acetyl-3-aminopropyl)-fluoren-9-yl]ethane, 1,4-bis[9-(N-acetyl-3-aminopropyl)fluoren-9-yl]butane, 1,10-bis[9-(N-acetyl-3-aminopropyl)fluoren-9-yl]-ethane, 1,2-bis[9-(N-valeryl-3-aminopropyl(fluoren-9-yl]ethane, 1,2,-bis[9-(N-acetyl-3-amino-2-methylpropyl)fluoren-9-yl]ethane, and the like.

The bis[9-(N-alkanoyl-3-aminoalkyl)fluoren-9-yl]-alkanes of this invention are produced, for example, by hydrogenation of a mixture of a bis[9-(2-cyanoalkyl)fluoren-9-yl]alkane, an alkanoic acid anhydride and an alkali metal alkanoate in contact with hydrogenation catalyst.

The alkanoic acid anhydrides suitable for use in producing the bis[9-(N-alkanoyl-3-aminoalkyl)fluoren-9-yl]-alkanes of this invention are the anhydrides of lower alkanoic acids such as acetic acid, propionic acid, butyric acid, pentanoic acid, and the like. In this reaction, the mole ratio of acid anhydride to bis[9-(2-cyanoalkyl)-fluoren-9-yl]alkane can vary from about 0.5:1 or less to about 4:1 or higher, with mole ratios of from about 1:1 to about 2:1 preferred.

The alkali metal alkanoate employed is preferably the alkali metal salt of the alkanoic acid whose anhydride is employed during the hydrogenation reaction. The alkali metal salts can be the lithium, sodium, potassium, rubidium, or cesium salts of the alkanoic acid. As examples of suitable alkali metal alkanoates one can mention lithium acetate, sodium acetate, potassium acetate, rubidium acetate, cesium acetate, sodium propionate, sodium butyrate, sodium valerate, and the like. In general, the alkali metal alkanoates are present in the reaction mixture in an amount varying from 5 to 100 weight percent based on the bis[9-(2-cyanoalkyl)-fluoren-9-yl]alkane, with from 10 to 30 weight percent preferred.

The hydrogenation catalyst can be any of the Raney metal catalysts known to the art, with Raney nickel being preferred. The catalyst is employed in amounts varying from 2 to 40 weight percent, based on the bis[9-(2-cyanoalkyl)fluoren-9-yl]alkane, with amounts of from 10 to 30 percent being preferred. The hydrogenation is carried out at hydrogen pressures varying from 40 to 100 p.s.i.g., or more, with pressures of from about 50 to about 75 p.s.i.g. being preferred, and at reaction temperatures of from about 25° C. to about 100° C., with temperatures of from about 30° C. to about 80° C. being preferred.

The bis[9-(3-aminoalkyl)fluoren-9-yl]alkanes of this invention are represented by the formula:

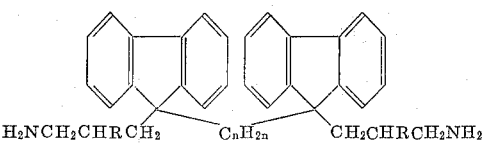

$H_2NCH_2CHRCH_2$    $C_nH_{2n}$    $CH_2CHRCH_2NH_2$ wherein $n$ and R are as previously defined. As examples of these novel diamines one can mention 1,2-bis[9-(3-aminopropyl)fluoren - 9 - yl]ethane, 1,4 - bis[9 - (3-aminopropyl)fluoren - 9 - yl]butane, 1,10 - bis[9 - (3-aminopropyl)fluoren - 9 - yl]decane, 1,2 - bis[9 - (3-amino - 2 - methylpropyl)fluoren - 9 - yl]ethane, and the like.

The bis[9-(3-aminoalkyl)fluoren-9-yl]alkanes of this invention are readily produced by hydrolysis of the bis-[9-(N-alkanoyl-3-aminoalkyl)fluoren-9-yl]alkanes of the invention. The hydrolysis can be accomplished by methods known to those skilled in the art, such as by heating in contact with a mixture of aqueous sodium hydroxide and methanol at a temperature of from about 150° to 250° C.

The bis[9-(3-aminoalkyl)fluoren-9-yl]alkanes can also be produced by reduction of the bis[9-(2-cyanoalkyl)-fluoren-9-yl]alkanes of this invention, such as by the lithium aluminum hydride reduction of the bis[9-(2-cyanoalkyl)fluoren-9-yl]alkanes.

The following examples are illustrative:

EXAMPLE I

1,2-bis(9-fluorenyl)ethane

A three-liter rocker autoclave was charged with 332 grams of fluorene, 500 grams of ethylene glycol, and 85 grams of potassium hydroxide. The autoclave was sealed, pressured to 25 p.s.i.g. with air and heated at 220° C. for 20 hours while agitating by rocking. The autoclave was cooled, opened and the contents were removed and slurried in 1 liter of water. After filtration from the aqueous slurry, washing with water and then with methanol and drying, the 1,2 - bis(9 - fluorenyl)ethane produced weighed 157 grams and melted at 228–229.5°C.

EXAMPLE II

1,6-bis(9-fluorenyl)hexane

Employing apparatus and procedures similar to those disclosed in Example I, 166 grams of fluorene, 70 grams of 1,6-hexanediol and 42.5 grams of potassium hydroxide were reacted at 210–220° C. for 4 hours to produce 143 grams of 1,6-bis(9-fluorenyl)hexane. After recrystallizing from a mixture of isopropanol and dioxane the 1,6-bis(9-fluorenyl)hexane melted at 109–109.5° C.

EXAMPLE III

1,2-bis[9-(2-cyanoethyl)fluoren-9-yl]ethane

To a charge containing 36 grams of 1,2-bis(9-fluorenyl)-ethane, 750 cc. of dioxane and 10 cc. of a 32 percent solution of benzyltrimethylammonium hydroxide in methanol as a catalyst, there were slowly added 20 grams of acrylonitrile with stirring. The temperature of the reaction mixture rose from 27° C. to 37° C. After cooling to 29° C. and stirring for another 2 hours, an additional 10 cc. of the benzyltrimethylammonium hydroxide-methanol solution and 20 grams of acrylonitrile were added. The reaction mixture was filtered and the solid 1,2-bis[9-(2-cyanoethyl)fluoren-9-yl]ethane was recovered, which after recrystallization from dioxane, weighed 26 grams and melted at 275–277° C.

*Microanalysis.*—Calculated for $C_{34}H_{28}N_2$: C, 89.94%; H, 60.3%; N, 6.03%. Found: C, 89.95%; H, 6.10%; N, 6.20%.

The structure of the 1,2-bis[9-(2-cyanoethyl)fluoren-9-yl]ethane was further confirmed by infrared spectroscopy.

In a similar manner, 1,2-bis[9-(2-cyanopropyl)fluoren-9-yl]ethane is produced by substituting methacrylonitrile for acrylonitrile.

EXAMPLE IV

1,4-bis[9-(2-cyanoethyl)fluoren-9-yl]butane

Employing apparatus and procedures similar to those described in Example III, 40 grams of 1,4-bis(9-fluorenyl)butane (produced in a manner similar to that described in Example I by reacting fluorene with 1,4-butane diol in the presence of potassium hydroxide) were reacted with 16 grams of acrylonitrile to produce 34 grams of 1,4-bis[9-(2-cyanoethyl)fluoren-9-yl]-butane which, after recrystallization from an isopropanol-benzene mixture, melted at 181° C.–182° C.

*Microanalysis.*—Calculated for $C_{36}H_{32}N_2$: C, 87.78%; H, 6.54%; N, 5.68%. Found: C, 87.83%; H, 6.78%; N, 5.89%.

EXAMPLE V

1,5-bis[9-(2-cyanoethyl)fluoren-9-yl]pentane

Employing apparatus and procedures similar to those described in Example III, 30 grams of 1,5-bis(9-fluorenyl)pentane (produced in a manner similar to that described in Example I by reacting fluorene with 1,5-pentane diol in the presence of potassium hydroxide) were reacted with 16 grams of acrylonitrile to produce 26 grams of 1,5-bis[9-(2-cyanoethyl)fluoren-9-yl]-pentane which, after recrystallization from methanol, melted at 120–121° C.

*Microanalysis.*—Calculated for $C_{37}H_{34}N_2$: C, 87.61%; H, 6.76%; N, 5.53%. Found: C, 88.01%; H, 6.69%; N, 5.65%.

EXAMPLE VI

1,6-bis[9-(2-cyanoethyl)fluoren-9-yl]hexane

Employing apparatus and procedures similar to those described in Example III, 34 grams of 1,6-bis(9-fluorenyl)-hexane were reacted with 16 grams of acrylonitrile to produce 31 grams of 1,6-bis[9-(2-cyanoethyl)fluoren-9-yl]hexane which, after recrystallization from methanol, melted at 125.5–126.5° C.

*Microanalysis.*—Calculated for $C_{38}H_{36}N_2$: C, 87.66%; H, 6.96%; N, 5.38%. Found: C, 87.38%; H, 6.90%; N, 5.57%.

EXAMPLE VII

1,2-bis[9-(2-carboxyethyl)fluoren-9-yl]ethane

A mixture of 300 grams of 1,2-bis[9-(2-cyanoethyl)-fluoren-9-yl]ethane, 750 grams of acetic acid and 750 grams of aqueous 48 percent hydrobromic acid as catalyst was refluxed vigorously for 4 days. After filtration from the reaction mixture, washing with water and recrystallization from dioxane, there were obtained 277 grams of 1,2-bis[9-(2-carboxyethyl)fluoren-9-yl]ethane which melted at 285–287° C.

*Microanalysis.*—Calculated for $C_{34}H_{30}O_4$: C, 81.27%; H, 5.98%. Found: C, 81.02%; H, 6.09%.

The structure of the 1,2-bis[9-(2-carboxyethyl)fluoren-9-yl]-ethane was further confirmed by infrared spectroscopy.

In a similar manner, 1,2-bis[9-(2-carboxypropyl)-fluoren-9-yl]ethane is produced by substituting 1-2-bis[9-(2-cyanopropyl)fluoren-9-yl]ethane for 1,2 - bis[9 - (2-cyanoethyl-fluoren-9-yl]ethane.

EXAMPLE VIII

1,4-bis[9-(2-carboxyethyl)fluoren-9-yl]butane

Employing apparatus and procedures similar to those described in Example VII, 10 grams of 1,4-bis[9-(2-cyanoethyl)-fluoren-9-yl]butane, 200 milliliters of acetic acid and 200 milliliters of aqueous 48 percent hydrobromic acid were refluxed for 16 hours to produce 8 grams of 1,4-bis[9-(2-carboxyethyl)fluoren-9-yl]butane which, after recrystallization from isopropanol, melted at 261–263° C.

*Microanalysis.*—Calculated for $H_{36}H_{34}O_4$: C, 81.48%; H, 6.45%. Found: C, 81.49%; H, 6.51%.

EXAMPLE IX
*1,5-bis[9-(2-carboxyethyl)fluoren-9-yl]pentane*

Employing apparatus and procedures similar to those described in Example VII, 10 grams of 1,5-bis[9-(2-cyanoethyl)fluoren-9-yl]pentane, 200 milliliters of acetic acid and 200 milliliters of aqueous 48 percent hydrobromic acid were refluxed for 16 hours to produce 10 grams of 1,5 - bis[9-(2-carboxyethyl)fluoren-9-yl]pentane which, after recrystallization from a cyclohexane-benezene-isopropanol mixture, melted at 180–181° C.

*Microanalysis.*—Calculated for $C_{37}H_{36}O_4$: C, 81.58%; H, 6.66%. Found: C, 81.34%; H, 6.69%.

EXAMPLE X
*1,6-bis[9-(2-carboxyethyl)fluoren-9-yl]hexane*

Employing apparatus and procedures similar to those described in Example VII, 10 grams of 1,6-bis[9-(2-cyanoethyl)-fluoren-9-yl]hexane, 200 milliliters of acetic acid, and 200 milliliters of aqueous 48 percent hydrobromic acid were refluxed for 16 hours to produce 10 grams of 1,6-bis[9-(2-carboxyethyl)fluoren-9-yl]hexane which, after recrystallization from isopropanol, melted at 218–219° C.

*Microanalysis.*—Calculated for $C_{38}H_{38}O_4$: C, 81.69%; H, 6.86%. Found: C, 81.75%; H, 7.11%.

EXAMPLE XI
*1,2-bis[9-(2-carboxyethyl)fluoren-9-yl]ethane*

1,2 - bis[9-(2-carboxyethyl)fluoren-9-yl]ethane is produced by reacting 1,2-bis(9-fluoroenyl)ethane with potassium acrylate in the presence of potassium hydroxide at about 300° C. to produce the dipotassium salt of 1,2-bis[9-(2-carboxyethyl)fluoren-9-yl]ethane and acidifying the reaction mixture with aqueous hydrochloric acid to liberate the free acid.

In a similar manner, 1,2-bis[9-(2-carboxypropyl)fluoren-9-yl]ethane is produced by substituting potassium methacrylate for potassium acrylate.

EXAMPLE XII
*1,6-bis[9-(N-acetyl-3-aminopropyl)fluoren-9-yl]hexane*

A hydrogenating vessel was charged with 10 grams of 1,6-bis[9-(2-cyanoethyl)fluoren-9-yl]hexane, 100 grams of acetic anhydride, 2 grams of sodium acetate and about 3 grams of neutral Raney nickel catalyst. The hydrogenator was sealed, pressured to 59.5 p.s.i.g. with hydrogen and heated at 80° C. for 6 hours, over which time the hydrogen pressure decreased to 52 p.s.i.g. The hydrogenator was cooled, opened, and the contents were filtered to remove the Raney nickel. The filtrate was added to 500 milliliters of water, whereupon the 1,6-bis[9-(N-acetyl-3-aminopropyl)fluoren-9-yl]hexane produced precipitated. After filtration and recrystallization from hexane-isopropanol mixture, it weighed 10 grams and melted at 176–179° C. After two additional recrystallizations from a hexane-isopropanol mixture the 1,6 - bis[9-(N-acetyl-3-aminopropyl)fluoren-9-yl]hexane melted at 177–180° C.

*Microanalysis.*—Calculated for $C_{38}H_{40}O_2$: C, 82.4%; H, 7.9%; N, 4.6%. Found: C, 82.4%; H, 8.0%; N, 4.2%.

EXAMPLE XIII
*1,2-bis[9-(N-acetyl-3-aminopropyl)fluoren-9-yl]ethane*

Employing apparatus and procedures similar to those described in Example XII, 10 grams of 1,2-bis[9-(2-cyanoethyl)fluoren-9-yl]ethane, 100 grams of acetic anhydride, 2 grams of sodium acetate and about 3 grams of Raney nickel catalyst were hydrogenated at 35–45° C. for 5 hours to produce 9 grams of 1,2-bis[9-(N-acetyl-3-aminopropyl)fluoren-9-yl]ethane, which, after recrystallization from dioxane, melted at 267.5–269.5° C.

*Microanalysis.*—Calculated for $C_{38}H_{40}N_2O_2$: C, 82.0%; H, 7.2%; N, 5.0%. Found: C, 81.8%; H, 7.1%; N, 4.7%.

In a similar manner 1,2 - bis[9-(N-acetyl-3-amino-2-methylpropyl)fluoren-9-yl]ethane is produced by substituting 1,2-bis[9-(2-cyanopropyl)fluoren-9 - yl]ethane for 1,2-bis[9-(2-cyanoethyl)fluoren-9-yl]ethane, and 1,2 - bis[9 - (N-valeryl-3-aminopropyl)fluoren-9-yl]ethane is produced by substituting valeric anhydride for acetic anhydride and sodium valerate for sodium acetate.

EXAMPLE XIV
*1,2-bis[9-(3-aminopropyl)fluoren-9-yl]ethane*

A rocker autoclave was charged with 10 grams of 1,2-bis[9-(N-acetyl-3-aminopropyl)fluoren - 9 - yl]ethane, 8 grams of sodium hydroxide, 10 grams of water and 200 milliliters of methanol. The autoclave was sealed and heated at 196–205° C. for 10 hours while agitating the reaction mixture by rocking. The autoclave was cooled, opened and the contents were poured into 750 milliliters of water, whereupon 1,2-bis[9-(3-aminopropyl)fluoren-9-yl]ethane precipitated, which, after filtering and drying, weighed 6 grams. After recrystallization from cyclohexane the 1,2-bis[9-(3-aminopropyl)fluoren - 9 - yl]ethane melted at 208–210° C.

*Microanalysis.*—Calculated for $C_{34}H_{36}N_2$: C, 86.4%; H, 7.7%; N, 5.9%. Found: C, 86.0%; H, 7.5%; N, 6.0%.

The structure of the 1,2-bis[9-(3-aminopropyl)fluoren-9-yl]ethane was further confirmed by infrared spectroscopy.

In a similar manner, 1,2-bis[9-(3-amino-2-methylpropyl)fluoren-9-yl]ethane is produced by substituting 1,2-bis[9-(N-acetyl-3-amino-2-methylpropyl)fluoren - 9 - yl]ethane for 1,2-bis[9-(N-acetyl-3-aminopropyl)fluoren-9-yl]ethane.

What is claimed is:

1. A bis[9-(carboxyalkyl)fluoren-9-yl]alkane of the formula:

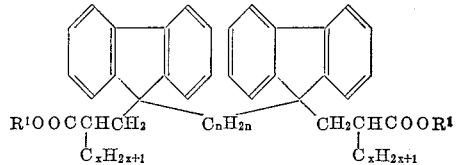

wherein *n* is an integer having a value of from 2 to 10; *x* is an integer having a value of from 0 to 1; and $R^1$ is a member selected from the group consisting of hydrogen, an alkali metal and an alkyl radical of from 1 to 10 carbon atoms.

2. A bis[9-(2-carboxyalkyl)fluoren-9-yl]alkane of the formula:

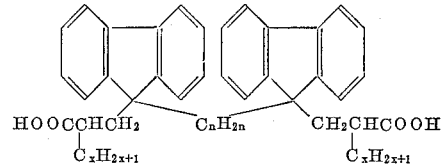

wherein *n* is an integer having a value of from 2 to 10; and *x* is an integer having a value of from 0 to 1.

3. 1,2-bis[9-(2-carboxyethyl)fluoren-9-yl]ethane.
4. 1,4-bis[9-(2-carboxyethyl)fluoren-9-yl]butane.
5. 1,5-bis[9-(2-carboxyethyl)fluoren-9-yl]pentane.
6. 1,6-bis[9-(2-carboxyethyl)fluoren-9-yl]hexane.

References Cited by the Examiner

UNITED STATES PATENTS 3,114,768  12/1963  Fritz _____ 260—515

LORRAINE A. WEINBERGER, *Primary Examiner.*

T. L. GALLOWAY, *Assistant Examiner.*